Oct. 24, 1950 J. H. GOLDBERG 2,527,250
DISPENSING APPARATUS
Filed April 27, 1945 3 Sheets-Sheet 1
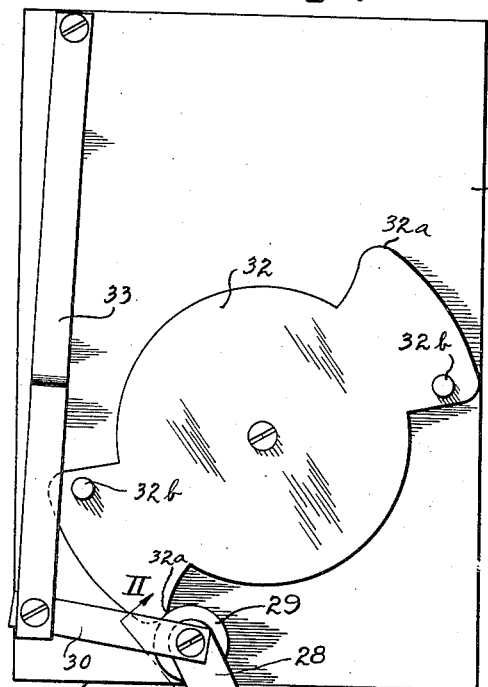
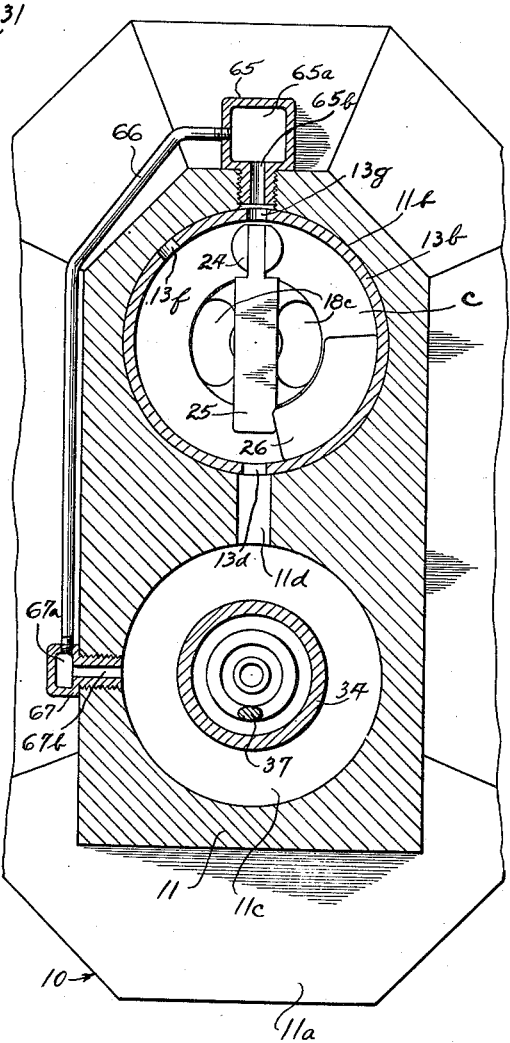
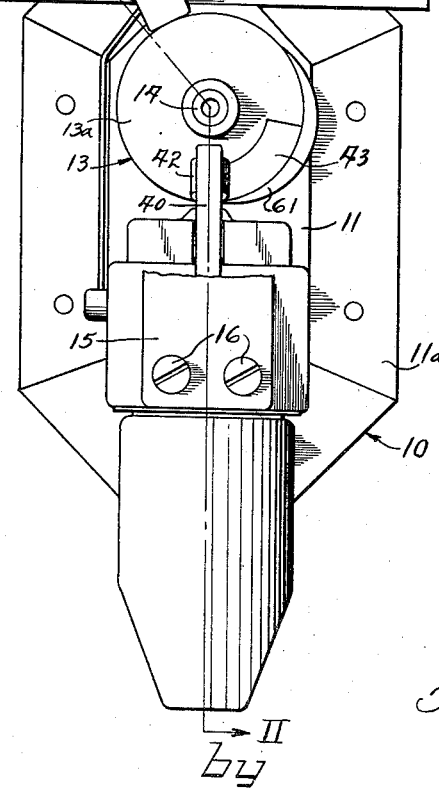
Inventor
Joseph H. Goldberg
by The Firm of Charles W. Hills
Attys

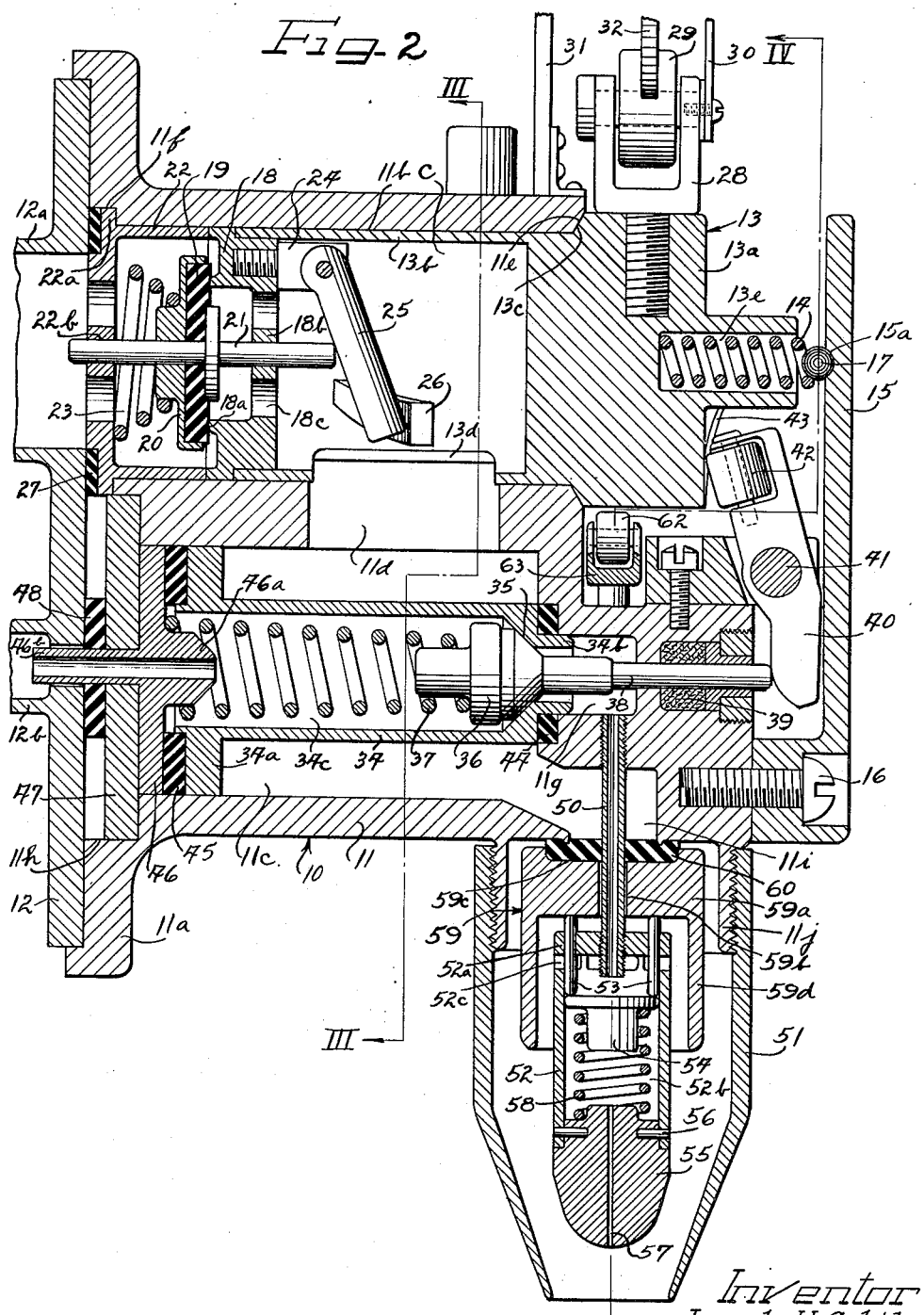

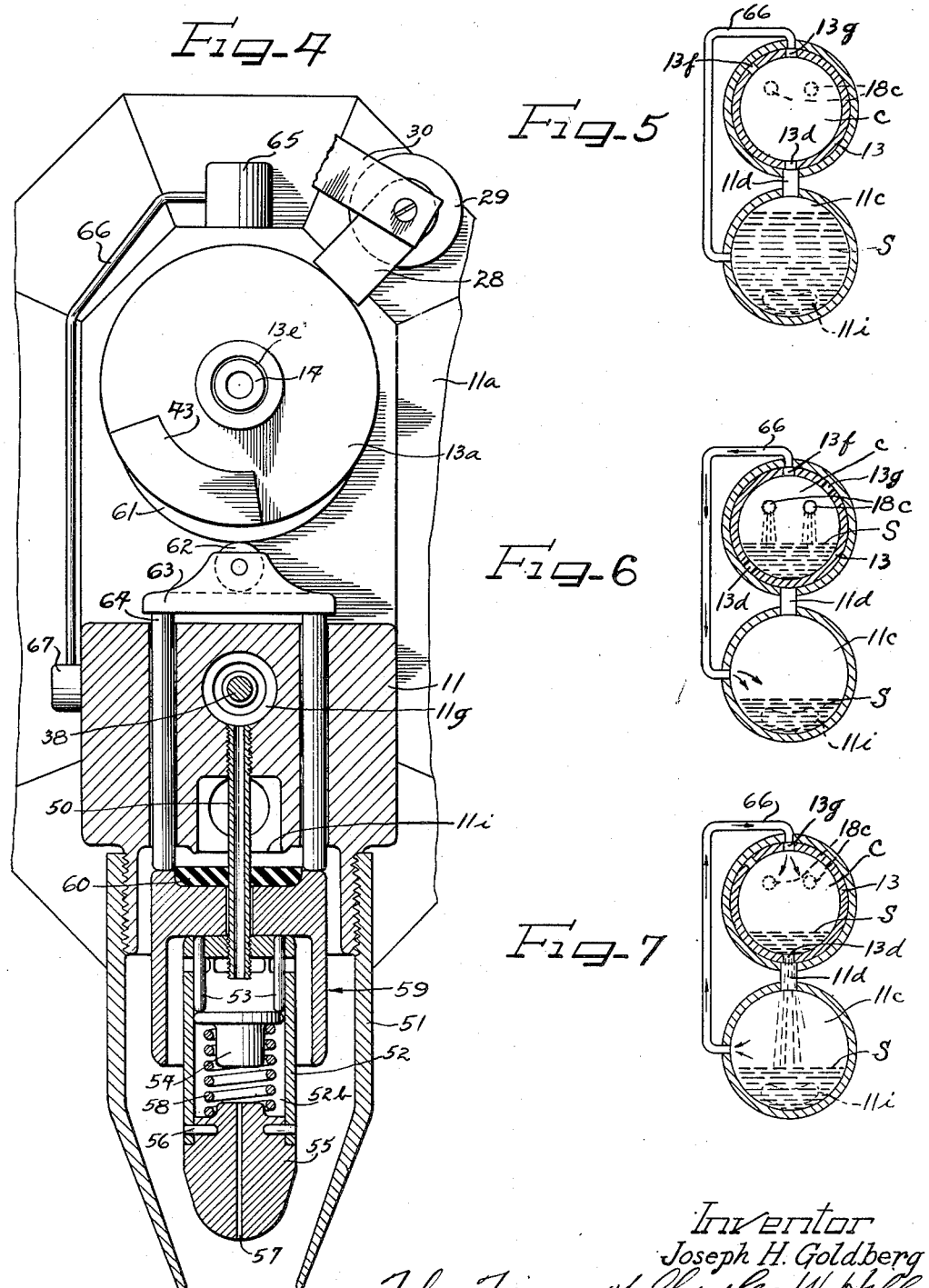

Patented Oct. 24, 1950

2,527,250

UNITED STATES PATENT OFFICE 2,527,250

DISPENSING APPARATUS

Joseph H. Goldberg, Chicago, Ill., assignor to Drink-O-Matic Co., Chicago, Ill., a partnership Application April 27, 1945, Serial No. 590,649

9 Claims. (Cl. 225—21)

This invention relates to dispensing apparatus for carbonated beverages and the like embodying a leak-proof measuring valve and a recirculating pressure purge arrangement which facilitates movement of liquid in the apparatus without introducing air.

Specifically, this invention deals with a measuring valve equipped with a shut-off valve and arranged to actuate the shut-off valve so that the measuring valve chamber is empty except for a small time interval between start of the filling operation and end of the dumping operation.

The invention will hereinafter be specifically described as embodied in dispensing apparatus for beverage vending machines, but it should be understood that the principles of this invention are broadly applicable to measuring valves and pressure purge systems.

In beverage vending machines it has been customary to provide measuring valves with frustoconical plugs for measuring the amount of flavoring syrup to be dispensed with each drink. The measuring chambers of these plugs were in constant communication with the syrup tank and, due to the head pressure of syrup in the tank, leakage of the valve was always a source of trouble. In attempting to avoid leakage, the conical plugs were wedged into frusto-conical valve chambers by means of relatively heavy springs so that the conical plug surfaces would have sealing engagement with the conical chamber walls.

It has also been customary to equip beverage dispensing apparatus with a vent to the atmosphere, to permit dumping of the measuring valve and prevent formation of a vapor lock in the apparatus. This vent arrangement has proven to be quite troublesome because the interior of the dispensing apparatus is thereby exposed to air, as well as germs or dust surrounding the apparatus. Some beverage syrups, when exposed to air, become gummy and are subject to a fungus growth which is highly objectionable.

The present invention now provides a shut-off valve for the measuring valve of a dispensing apparatus, so that the measuring valve chamber is under head pressure of the syrup tank only when it is being filled. The shut-off valve is opened by the measuring valve whenever the measuring valve is rotated to syrup-filling position. The measuring valve is in syrup-filling position only for a small time interval and then the measuring valve is rotated to dumping position. As soon as the measuring valve is rotated out of filling position, the shut-off valve is closed and remains closed until the next filling operation. Thus, the measuring valve is only filled with syrup between filling and dumping operations and, since it is not subject to the head pressure of the syrup in the tank except during the filling operation, leakage is not a problem. The valve plug is made in easy rotatable cylindrical form and is only subject to light spring loads to insure against leakage. As a result, operating torque requirements for the valve are materially decreased.

The invention also provides a closed pressure purge arrangement so that the syrup-receiving chambers of the apparatus are sealed from the atmosphere and still are not subject to vapor lock. According to the invention, the top portion of the measuring valve chamber is vented to a dump chamber in such a manner that air can flow between the chambers to assist the discharge of syrup therefrom. Thus, when the measuring chamber is being filled, air from the valve flows into the dump chamber to assist evacuation of said chamber. When the measuring chamber is being emptied into the dump chamber, air from the dump chamber flows back to the top of the measuring chamber to push the syrup into the dump chamber.

It is, thus, a feature of this invention to provide dispensing apparatus with a pressure purge arrangement that avoids the necessity for atmospheric vents.

An object of the invention is to provide a measuring valve for dispensing apparatus which is only subject to fluid pressure for very small time intervals and therefore is less subject to leakage.

Another object of the invention is to provide a measuring valve which automatically controls a shut-off valve so that the measuring valve is in communication with a source of material to be measured only when it is being filled with material.

A still further object of the invention is to provide a dispensing apparatus for carbonated beverages wherein beverage syrups are in communication with a measuring valve only when this measuring valve is being filled with the syrup.

Another object of the invention is to provide a measuring valve with a spring-pressed shut-off valve actuated by a cam in the measuring valve whenever the measuring valve is rotated to and from filling position.

A still further object of the invention is to provide a carbonated beverage dispensing apparatus with a shut-off attachment for the measuring valve thereof and a pressure purge system for facilitating flow of fluid through the apparatus without introducing atmospheric air into the apparatus.

Other and further objects and features of this invention will be apparent to those skilled in the art from the following detailed description of the annexed sheets of drawings which, by way of a preferred example only, illustrate one embodiment of the invention.

On the drawings:

Figure 1 is a front elevational view illustrating the dispensing apparatus of this invention together with a cam for actuating the apparatus.

Figure 2 is a vertical cross-sectional view, on a larger scale, taken along the line II—II of Figure 1.

Figure 3 is a vertical cross-sectional view, with parts in elevation, taken along the line III—III of Figure 2.

Figure 4 is a vertical cross-sectional view, with parts in front elevation, taken along the line IV—IV of Figure 2.

Figures 5, 6, and 7 are diagrammatic views illustrating the operation of the pressure purge arrangement of this invention.

As shown on the drawings:

In Figures 1 to 4, the reference numeral 10 designates generally a carbonated beverage dispensing unit. The unit 10 has a casing 11 with an outturned flange 11a around the back end thereof receiving, in its recessed back face, a mounting plate or wall member 12.

The casing 11, as best shown in Figures 2 and 3, has upper and lower chambers 11b and 11c respectively, connected through a passage 11d. The chamber 11b is defined by a straight cylindrical bore through the upper portion of the casing 11. A beveled mouth 11e is provided on the front face of the casing 11 around the chamber 11b. A counterbore 11f is provided inwardly from the rear face of the casing to present a shoulder.

A valve plug 13 has a solid head 13a projecting forwardly from the front of the casing 11 together with an integral cylindrical hollow portion 13b in the cylindrical chamber 11b provided by the cylindrical bore. A tapered portion 13c is formed between the head 13a and the hollow portion 13b to coact with the tapered mouth 11e in providing a seal to prevent leakage from the measuring chamber C provided by the hollow portion 13b of the plug valve 13. The portion 13b has a slot 13d therein adapted to selectively communicate with the passage 11d.

A well 13e is provided in the head portion 13a of the valve 13 to receive a coil spring 14. A plate 15 is secured on the front face of the casing 11 by means of screws 16. This plate 15 has a depression 15a on its inner face receiving a ball 17 bottoming the spring 14. This ball permits free rotation of the spring and plug 13 but holds the spring under compression to urge the sealing faces 11e and 13c into sealing engagement.

The portion 13b of the valve 13 terminates short of the chamber 11b and a valve seat 18 is inserted in the chamber and bottomed on the end of the valve portion 13b. This valve seat 18 has an annular seating face 18a for receiving a rubber or plastic material valve member 19 thereon. This valve member 19 is encased in a metal washer 20 and surrounds a stem 21 projecting through both faces of the assembly. One portion of the stem is slidably mounted in a bearing 18b provided in the central portion of the valve seat 18. Ports 18c permit flow of fluid past the valve seat into the measuring chamber C of the valve plug 13.

A spider 22 bottoms the seat ring 18 and has a head portion 22a seated in the counterbore 11f and bottomed on the shoulder at the end of this counterbore. The spider provides a bearing 22b for the stem 21. A spring 23 is bottomed on the spider 22 and acts on the washer 20 of the valve assembly to urge the valve member 19 against the seat 18a.

The seat ring 18 has a lug 24 threaded therein pivotally supporting a pin 25 which overlies the valve stem 21 and is acted on by a cam 26 in the measuring chamber C.

The spider 22 is held in the chamber 11b of the casing by the back plate 12. A sealing ring 27 is interposed between the spider and the back plate.

The back plate has a boss portion 12a providing a conduit communicating with the spider for flow of beverage syrup from a supply tank (not shown) to the mixing valve whenever the valve 19 is opened by the cam 26 causing the pin 25 to force the stem 21 against the pressure of the spring 23 to move the valve 19 away from the seat 18a.

The valve head 13a has a yoke member 28 threaded therein and rotatably carrying a cam roller 29. A link 30 is also pivoted to the yoke 28.

A mounting plate 31, best shown in Figure 1, is secured on the casing 11 and rotatably supports a cam 32 which has portions 32a for acting on the cam roller 29 to rotate the plug to filling position together with pins 32b for acting on a lever 33 to swing the plug back to the dumping position shown in Figure 2. The plug valve 13 is thus oscillated or rocked throughout only a portion of a turn for moving the slot 13d into and out of registration with the passage 11d and for causing the cam 26 carried by the valve to open the shut-off valve 19 so that the measuring chamber C can receive syrup when the slot 13d is closed or out of registration with the passage 11d.

The dumping chamber 11c has a tubular fitting 34 therein providing a valve seat 35 for a valve 36 that is pressed against the seat by means of a spring 37 in the fitting 34. A stem 38 projects through the seat 35 and through a packing 39 in the front portion of the casing 11 to be acted on by one end of a lever 40 which is pivoted to the front of the casing 11 by means of a pin 41 and which has the opposite end thereof rotatably carrying a roller 42 acted on by a cam 43 on the front face of the plug 13a.

The fitting 34 is held in the central portion of the dump chamber 11c by a flange 34a at one end thereof which snugly engages the wall of the chamber and by a neck portion 34b which seats in a well 11g of the casing. A seal ring 44 seals the well 11g from the chamber 11c. A second seal ring 45 backs the flange 34a and receives a fitting 46 thereagainst with a nose portion 46a projecting into the chamber 34c provided by the fitting 34. This member 46 has a flange snugly seating in the chamber 11c and receiving thereagainst a plate 47 seated in a counterbore 11h in the back wall of the casing 11. A hollow stem 46b of the member 46 projects through this member 47 and through a seal washer or gasket 48 interposed between the member 47 and the back wall 12. This back wall 12 has a second boss portion 12b which is connected to a source of carbonated water (not shown). The carbonated water is fed to the chamber 34C through the hollow stem 46b and hollow nose 46a of the member 46. The seal rings 44 and 45 prevent leakage of the carbonated water into the dump chamber 11c. The dump chamber 11c has an outlet opening 11i in the bottom of the casing 11 near the forward end thereof. A tube 50 is threaded in the casing to have one end thereof in communication with the well 11g and to have the other end thereof projecting through the opening 11i and through an externally threaded boss 11j of the casing. A dispensing nozzle 51 is threaded on this boss 11j.

A valve-support member 52 is suspended in the central portion of the nozzle 51 and has an end wall 52a threaded on the lower end of the tube 50. Pins 53 are slidably mounted in the end wall 52a and project into a chamber 52b in the member 52. A piston plug 54 is slidably seated in this chamber 52b. A nose piece 55 closes the lower end of the chamber 52b. This nose piece 55 is secured to the member 52 by means of pins 56. A vent 57 is provided in the nose piece 55 so that the piston plug 54 can slide in the chamber 52. A spring 58 in the chamber 52b is bottomed on the nose 55 and acts on the piston 54 to urge it against the pins 53 for moving the pins outwardly from the end wall 52a.

A valve carriage 59 has a head portion 59a with a bore 59b through the center thereof and a recess 59c in the top face thereof. The bore 59b receives the tube 50 freely therethrough. The recess 59c receives a rubber or plastic material valve head 60 which coacts with the bottom of the casing to close the opening 11i.

The valve carriage 59 has a hollow skirt portion 59d receiving the upper end of the member 52. The pins 53 act on the head 59a of the carriage to urge the carriage upward for carrying the valve 60 against its seat to close the opening 11i.

The tube 50 discharges into the chamber 52b above the piston 54 and outlet orifices 52c are arranged around the upper end of the member 52 to discharge carbonated water into the skirt 59d of the valve carriage 59. The syrup from the dumping chamber 11c will flow around the valve carrier 59 to admix with the carbonated water at the bottom of the skirt 59d in the nozzle 51.

The valve carrier 59 is actuated to open position by a cam 61 on the periphery of the measuring valve head 13a as best shown in Figure 4. This cam 61 acts on a roller 62 which is carried by a yoke 63 having depending pins 64 extending through a portion of the housing 11 on opposite sides of the well 11g to act on top of the head 59a of the carrier around the valve 60.

When the dispensing device is at rest, the valves are in the position shown in Figure 2. Thus the measuring valve 13 has its chamber C emptied because the slot 13d is in registration with the passage 11d and the shut-off valve 19 is closed. The carbonated water valve 35 is likewise closed because the roller 42 is on the low part of the cam 43. The chamber 11c contains the syrup dumped from the measuring chamber C. The valve 60 is closed to retain the syrup in this dump chamber 11c because the roller 62 is on the low spot of its operating cam 61. In this at rest position of the dispenser, the mixing valve is not subjected to head pressure of syrup in the syrup tank, and sealing of the valve is quite easy.

When the dispenser is actuated by the cam 32 the mixing valve 13 is first rocked in one direction to move the slot 13d out of registration with the passage 11d, to cause the cams 43 and 61 to open the valve 35 and 60 thereby emptying syrup from the dump chamber 11c into the nozzle 51 around the valve carrier 59 and to eject carbonated water through the orifices 52c into the valve carrier 59 where it will admix with the sheet of syrup draining off of the valve carrier 59 in the nozzle 51. A drink is thus dispensed.

After the valve 13 has been rotated sufficiently to move the slot 13d out of registration with the passage 11d so that the measuring chamber C is closed, the cam 26 has been moved to a position for tilting the pin 35 to open the valve 19 whereupon syrup will drain into the measuring chamber C from the boss 12a through the spider 22 and seat ring 18.

Since, in the operation of the device of this invention, liquid must flow into a measuring chamber, must be dumped from the measuring chamber into a dump chamber, and must be drained from the dump chamber whenever a drink is being dispensed, vapor lock conditions in the fluid flow path must be prevented so that the full measured amount of syrup will be dispensed each time the valve 60 is opened. To insure complete purging syrup from the dump chamber 11c, as well as complete filling of the measuring chamber C with syrup during the filling operation, the dispenser of this invention is equipped with a pressure purge arrangement composed of a fitting 65 threaded into the top of the casing 11, as best shown in Figure 3. This fitting has a hollow stem providing a passage 65b adapted to communicate with the measuring chamber C whenever ports 13f or 13g of the valve 13 are aligned with the passageway. The fitting 65 has a chamber 65a communicating with a tube 66. This tube 66 is connected at its other end to a second fitting 67 and communicates with a chamber 67a in this fitting. The fitting 67 has a hollow stem providing a passageway 67b communicating with the dump chamber 11c.

As shown in Figure 5, in the at rest position of the dispensing apparatus, the measuring chamber C of the measuring valve 13 is empty since the ports 18c are closed as indicated in dotted lines. The discharge slot 13d of the measuring valve is in communication with the passage 11d and the dump chamber 11c is thus filled with syrup S. The port 13g is in registration with the tube 66.

As shown in Figure 6, when a drink is being dispensed, the slot 13d of the measuring valve 13 is out of registration with the passage 11d since the measuring valve has been rotated to filling position and the shut-off valve has been opened to permit syrup S to flow from the valve ports 18c. In this position, the port 13f of the valve 13 is in registration with the tube 66 at the same time the discharge outlet 11i for the dump chamber 11c is opened and syrup in this dump chamber is being discharged. The incoming syrup from the ports 18c of the shutoff valve fills the measuring chamber C and displaces air therein through the tube 66 on top of the syrup S in the dump chamber 11c thereby assisting the discharge of this syrup out of the open outlet 11i.

As shown in Figure 7, when the measuring valve 13 is rotated to dump the syrup S into the dump chamber 11c after the beverage has been dispensed, the incoming syrup S fills the chamber 11c and displaces air therefrom through the tube 66 on top of the syrup S in the measuring chamber C, thereby assisting gravity flow of syrup through the slot 13d and passageway 11d into the dump chamber 11c. In this position of the valve the shut-off valve is closed so that the ports 18c are not in communication with the syrup tank.

From the above descriptions it will be understood that this invention provides a dispensing unit wherein a measuring valve is sealed from its source of supply except during the time it is being filled. This arrangement eliminates sealing difficulties for measuring valves and makes possible the use of cylindrical plugs which can be operated under low torque conditions. The invention also provides a pressure purge system which forces air on top of syrup being dumped and dispensed to aid these operations without introducing additional air into the unit. This prevents bacterial growth in the unit and avoids the heretofore-required atmospheric vents.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A dispensing device comprising a casing having an upper measuring valve chamber, a lower dump chamber, and a passageway connecting said chambers, a measuring valve rotatably mounted in said valve chamber having a discharge orifice adapted to be selectively registered with said passageway to dump a measured quantity of fluid into the dumping chamber, a shut-off valve for sealing the measuring chamber of said measuring valve from its source of fluid, means actuated by rotation of said measuring valve for opening said shut-off valve, an outlet valve for said dump chamber, a fitting in said dump chamber defining a chamber for fluid to be admixed with the fluid in the dump chamber, a valve controlling flow of said last-mentioned fluid from said chamber, a nozzle for receiving fluid from the dump chamber and fluid from said last-mentioned chamber, and cams on said measuring valve for actuating all of said valves.

2. A dispensing apparatus comprising a casing having intercommunicating upper and lower chambers, a measuring valve rotatably mounted in said upper chamber having a measuring chamber respectively placed into and out of communication with said lower chamber, a feed inlet to said measuring chamber, a shut-off valve in said inlet, a spring urging said shut-off valve to closed position, means for opening said valve, and a cam on said measuring valve actuating said means.

3. A dispensing device adapted for admixing measured amounts of flavoring syrup with carbonated water which comprises a casing having upper and lower compartments, a cylindrical measuring valve rotatably mounted in said upper compartment having a measuring chamber adapted to selectively communicate with said lower compartment, a syrup inlet for said measuring chamber, a shut-off valve in said inlet, means for closing said shut-off valve whenever said measuring valve is in communication with said lower chamber, means for opening said shut-off valve when said measuring chamber is out of communication with the lower chamber, and a vent conduit connecting the measuring chamber and the lower chamber for purging air from one of said chambers into the other of said chambers to assist discharge of syrup from the chambers.

4. A dispensing unit adapted for automatically vending measured quantities of syrup in admixed relation with carbonated water which comprises a casing having intercommunicating upper and lower chambers, a plug valve rotatably mounted in the upper chamber having a measuring chamber therein to dump measured quantities of syrup into the lower chamber, a syrup inlet for said plug valve chamber, a spring-pressed valve sealing said inlet, cam means on said measuring valve for opening said spring-pressed valve when the measuring chamber is out of communication with the lower chamber, a tubular member extending through said lower chamber having a carbonated-water inlet, a spring-pressed valve in said tubular member controlling flow of carbonated water therefrom, a drain valve for said lower chamber controlling flow of syrup therefrom, nozzle means for receiving carbonated water and syrup from said last-mentioned valve, and cam means on said measuring valve for actuating the last-mentioned valve.

5. In a dispensing unit, a cylindrical rotatable measuring valve having a measuring chamber with a liquids inlet in the end wall thereof and a liquids outlet in the side wall thereof, a spring pressed valve closing said inlet, and a cam means in said measuring chamber for opening said valve when said outlet is closed and for allowing said valve to close whenever said outlet is opened.

6. A dispensing device comprising intercommunicating measuring valve and dump chambers, a measuring valve rotatably mounted in said measuring valve chamber having a measuring compartment therein with an inlet and an outlet, a spring-pressed valve in said inlet for closing the inlet, said outlet adapted to be selectively placed into and out of registration with said dump chamber, and means on said measuring valve for opening the spring-pressed valve to allow fluid to enter the measuring compartment when the outlet for said compartment is out of registration with the dump chamber.

7. A dispensing unit for carbonated beverages and the like which comprises a measuring valve having a measuring chamber, a casing having a dump chamber for receiving measured quantities of syrup from said measuring valve, means for feeding syrup to said measuring valve, a shut-off valve in said means, a cam in said measuring valve for opening said shut-off valve whenever the measuring chamber is out of communication with the dump chamber, and a purge tube connecting said dump chamber and said measuring chambers to flow air between said chambers to facilitate the discharge of liquid from the chambers.

8. In a dispensing unit, a rockable measuring valve having a measuring chamber therein with an inlet and an outlet, means rockably mounting said valve for movement to and from an open outlet dumping position and a closed outlet filling position, a spring-pressed valve closing said inlet, and cam means coacting with said spring-pressed valve to open the inlet when the valve outlet is closed and allowing the inlet to close whenever said outlet is opened whereby said measuring valve only contains fluid as it is rocked to valve-opening position and before it reaches dumping position.

9. In a dispensing unit, a casing having a measuring valve chamber and a dump chamber beneath said measuring valve chamber together with a localized passageway connecting said chambers, a measuring valve rotatably mounted in said measuring chamber and having an outlet adapted to selectively register with said passageway for discharging fluid into the dump chamber, and means defining a purge path connecting the upper portion of the valve chamber with the dump chamber to vent air therebetween for facilitating liquid flow without introducing additional air.

JOSEPH H. GOLDBERG.

REFERENCES CITED

The following references are of record in the file of this patent:

UNITED STATES PATENTS

| Number | Name | Date |
| --- | --- | --- |
| 264,993 | Anderson | Sept. 26, 1882 |
| 1,402,604 | Harvey | Jan. 3, 1922 |
| 2,148,662 | Tweed | Feb. 28, 1939 |
| 2,413,736 | Thompson | Jan. 7, 1947 |